(12) United States Patent
Egan

(10) Patent No.: US 11,442,531 B2
(45) Date of Patent: Sep. 13, 2022

(54) INDEPENDENT THERMAL THROTTLING TEMPERATURE CONTROL FOR MEMORY SUB-SYSTEMS

(71) Applicant: Micron Technology, Inc., Boise, ID (US)

(72) Inventor: Curtis W. Egan, Brighton, CO (US)

(73) Assignee: Micron Technology, Inc., Boise, ID (US)

(*) Notice: Subject to any disclaimer, the term of this patent is extended or adjusted under 35 U.S.C. 154(b) by 22 days.

(21) Appl. No.: 17/101,234

(22) Filed: Nov. 23, 2020

(65) Prior Publication Data

US 2022/0164021 A1    May 26, 2022

(51) Int. Cl.
| | |
|---|---|
| *G06F 1/26* | (2006.01) |
| *G06F 1/32* | (2019.01) |
| *G06F 1/3296* | (2019.01) |
| *G06F 11/30* | (2006.01) |
| *G06F 1/3228* | (2019.01) |

(52) U.S. Cl.
CPC .......... *G06F 1/3296* (2013.01); *G06F 1/3228* (2013.01); *G06F 11/3062* (2013.01)

(58) Field of Classification Search
CPC ... G06F 1/3296; G06F 1/3228; G06F 11/3062
See application file for complete search history.

(56) References Cited

U.S. PATENT DOCUMENTS

| | | | | |
|---|---|---|---|---|
| 7,111,179 B1* | 9/2006 | Girson | .................... | G06F 1/324 713/320 |
| 2007/0106428 A1* | 5/2007 | Omizo | .................... | G05D 23/19 713/324 |
| 2013/0080804 A1* | 3/2013 | Ananthakrishan | ...... | G06F 1/206 713/320 |

* cited by examiner

*Primary Examiner* — Nitin C Patel
(74) *Attorney, Agent, or Firm* — Lowenstein Sandler LLP

(57) ABSTRACT

Device temperature values that are each indicative of a temperature at a respective device of multiple devices of a system are identified. Whether at least one device temperature value of the of device temperature values satisfies a respective thermal throttling threshold of multiple thermal throttling thresholds is determined by comparing each of the device temperature values to a respective one of the multiple thermal throttling thresholds that each correspond to one of the plurality of devices. Responsive to determining that the at least one device temperatures value satisfies the respective thermal throttling threshold, a power reduction value that is indicative of an amount of power consumption of the system that is to be reduced is determined. A power reducing operation is performed to reduce the power consumption of the system in accordance with the power reduction value.

20 Claims, 5 Drawing Sheets

INDEPENDENT THERMAL THROTTLING TEMPERATURE CONTROL FOR MEMORY SUB-SYSTEMS

TECHNICAL FIELD

Embodiments of the disclosure relate generally to memory sub-systems, and more specifically, relate to performing power reducing operations to protect devices of a memory sub-system from thermal stress.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1:
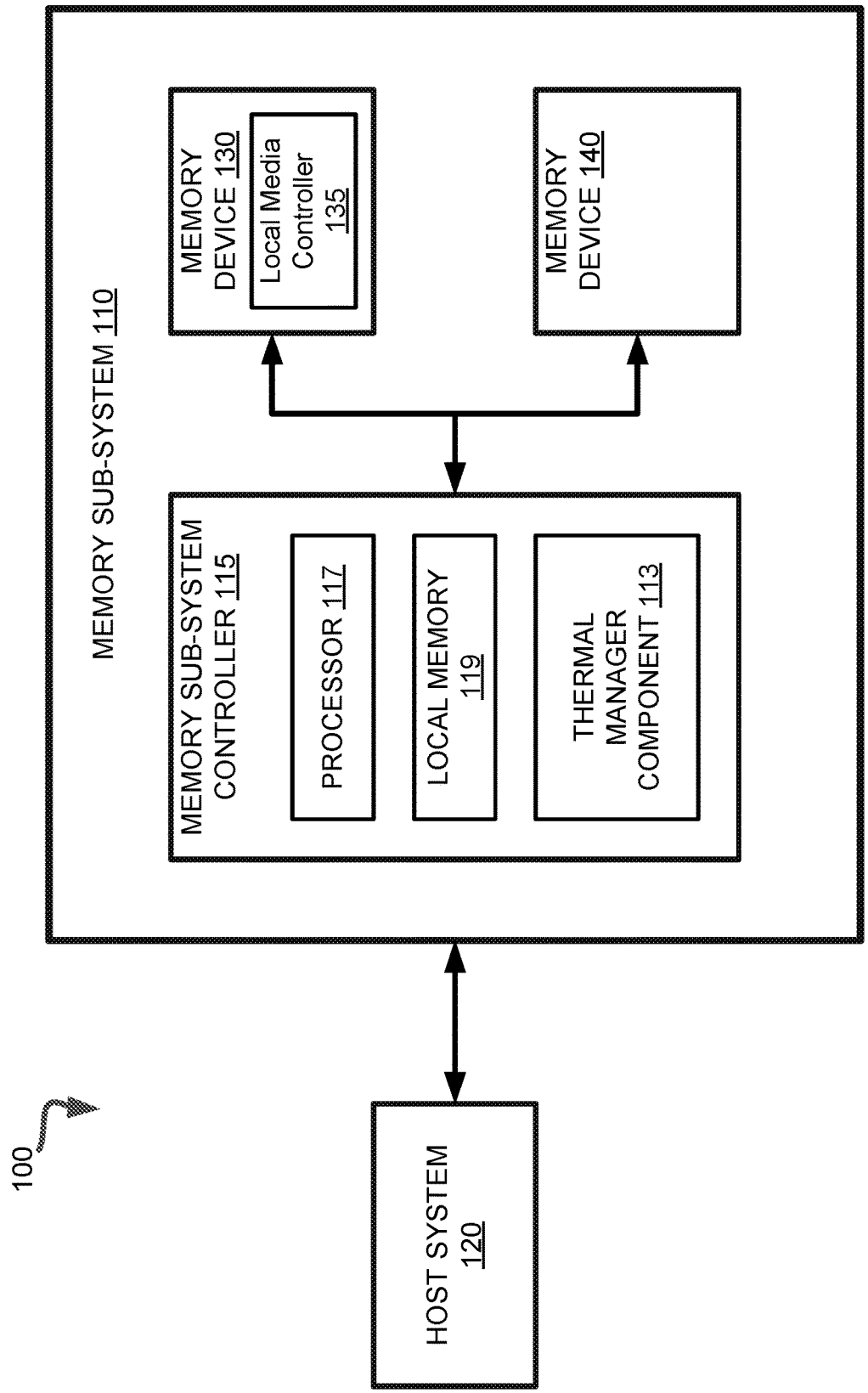
FIG. 1 illustrates an example computing environment that includes a memory sub-system, in accordance with some embodiments of the disclosure.

Embodiments of the disclosure are directed to performing a power reducing operation to reduce the power consumption of the system, such as a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components (e.g., devices), such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by not-and (NAND) type flash memory devices. Other examples of non-volatile memory devices are described below in conjunction with FIG. 1. A non-volatile memory device is one or more packages of one or more dice. Each die can consist of one or more planes. Planes can be groups into logic units (LUN). For some types of non-volatile memory devices (e.g., NAND devices), each plane includes a set of erasable blocks.

Thermal throttling can refer to a process or operations taken by a system or device to help cool down the system or device in an effort to prevent thermal stress from degrading the system or device. During operation, a system or devices can generate significant amounts of thermal energy. If the thermal energy is not appropriately reduced, the system or devices can be damaged. A system or devices can operate while implementing thermal throttling operations but typically experience a measurable and expected reduction in performance.

Thermal shutdown can refer to a process or operation taken by a system or device to prevent the system or device from exceeding a critical temperature that can permanently damage the system or device. A system or device can or cannot operate while implanting a thermal shutdown operation. The expected performance reduction of a system or device implementing a thermal shutdown operation is typically appreciably greater than the expected performance reduction of a system or device implementing a thermal throttling operation. For example, a memory sub-system that performs a thermal throttling operation can reduce the number of dice of memory devices at which parallel input and output (I/O) operations (e.g., read operations and write operations) can be performed. A memory sub-system that performs a thermal shutdown operation can prohibit all or normal I/O operations until the temperature of the system is reduced to an appropriate level.

In conventional memory sub-systems, a discrete temperature sensor (e.g., thermistor) is built into the memory sub-system to measure the temperature of the memory sub-system. When the measured temperature at the discrete temperature sensor reaches a particular temperature, the memory sub-system can perform some thermal throttling operation. Using a single sensor often does not accurately measure the temperature variations across the system, which can lead to inadequate thermal protection for the memory sub-system.

Some conventional memory sub-systems can implement different or staged thermal throttling levels, such as a low thermal throttle, a medium thermal throttle, and a high thermal throttle. Each successive level or stage performs a greater amount of thermal throttling. When the measured temperature is within a specified lower temperature range, the memory sub-system can implement a lower thermal throttle. When the measured temperature is within a specified medium temperature range, the memory sub-system can implement a medium thermal throttle. When the measured temperature is within a higher temperature range, the memory sub-system can implement a high thermal throttle. Implementing multiple levels or stages of thermal throttling based on respective ranges of temperatures introduces computational and storage overhead and undesirable performance complications (e.g., oscillation in performance and in temperature).

Aspects of the disclosure address the above challenges by implementing appropriate thermal throttling thresholds for different feedback devices (e.g., memory controller, non-volatile memory, or volatile memory) of the memory sub-system. Each device can be associated with a unique thermal throttling threshold. Multiple device temperature values that are each indicative of a temperature can be received from a single device or multiple devices are aggregated and can be interpreted as a single device temperature value. If any of the device temperature values satisfy respective thermal throttling thresholds, power reduction values that are indicative of an amount of power consumption of the memory sub-system that is to be reduced are calculated for each device (e.g., calculated for each feedback device in the memory sub-system). A respective power reduction value can be calculated proportional to a number of degrees that a corresponding device temperature value exceeds the respective thermal throttling threshold. The memory sub-system can select the most conservative power reduction value from the multiple power reduction values corresponding to the multiple feedback devices, which can be the power reduction value of a particular feedback device that identifies the greatest reduction in power. The memory sub-system can perform a power reducing operation that reduces the power consumption of the memory sub-system in accordance with the selected power reduction value.

By implementing different thermal throttling thresholds for different devices, a system, such as a memory sub-system, can more effectively control thermal throttling operations that address temperature differences across the devices of the system. Additionally, implementing a single thermal throttling threshold for each device of the system reduces the operational complexity of implementing a thermal throttling scheme. Performing power reducing operations that reduce power proportional to the number of degrees that a device temperature value exceeds a respective thermal throttling threshold provides simplicity and a more stable thermal throttling scheme.

It can be noted that memory sub-systems are described as examples of systems that can implement aspects of the disclosure for purposes of illustration, rather than limitation. Other systems, such as computer system or server systems, can also implement aspects of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a thermal manager component 113 that can control thermal throttling using independent thermal throttling thresholds. In some embodiments, the memory sub-system controller 115 includes at least a portion of the thermal manager component 113. In some embodiments, the thermal manager component 113 is part of the host system 110, an application, or an operating system. In other embodiments, local media controller 135 includes at least a portion of thermal manager component 113 and is configured to perform the functionality described herein.

In some embodiments, thermal manager component 113 can identify multiple device temperature values that are each indicative of a temperature at a respective device (e.g., controller 115, one or more memory devices 130, and/or one or memory devices 140) of the memory sub-system 110. The thermal manager component 113 can determine whether at least one of the device temperature values satisfies a respective thermal throttling threshold (TTT) that corresponds to a respective device. Each of the device temperature values can be compared to a respective one of multiple TTTs that each correspond to a particular device. Responsive to determining that at least one of the device temperature values satisfies a respective TTT, thermal manager component 113 determines a power reduction value that is indicative of an amount of power consumption of the memory sub-system 110 that is to be reduced. Thermal manager component 113 performs a power reducing operation to reduce the power consumption of the memory sub-system 110 in accordance with the power reduction value.

Figure 2:
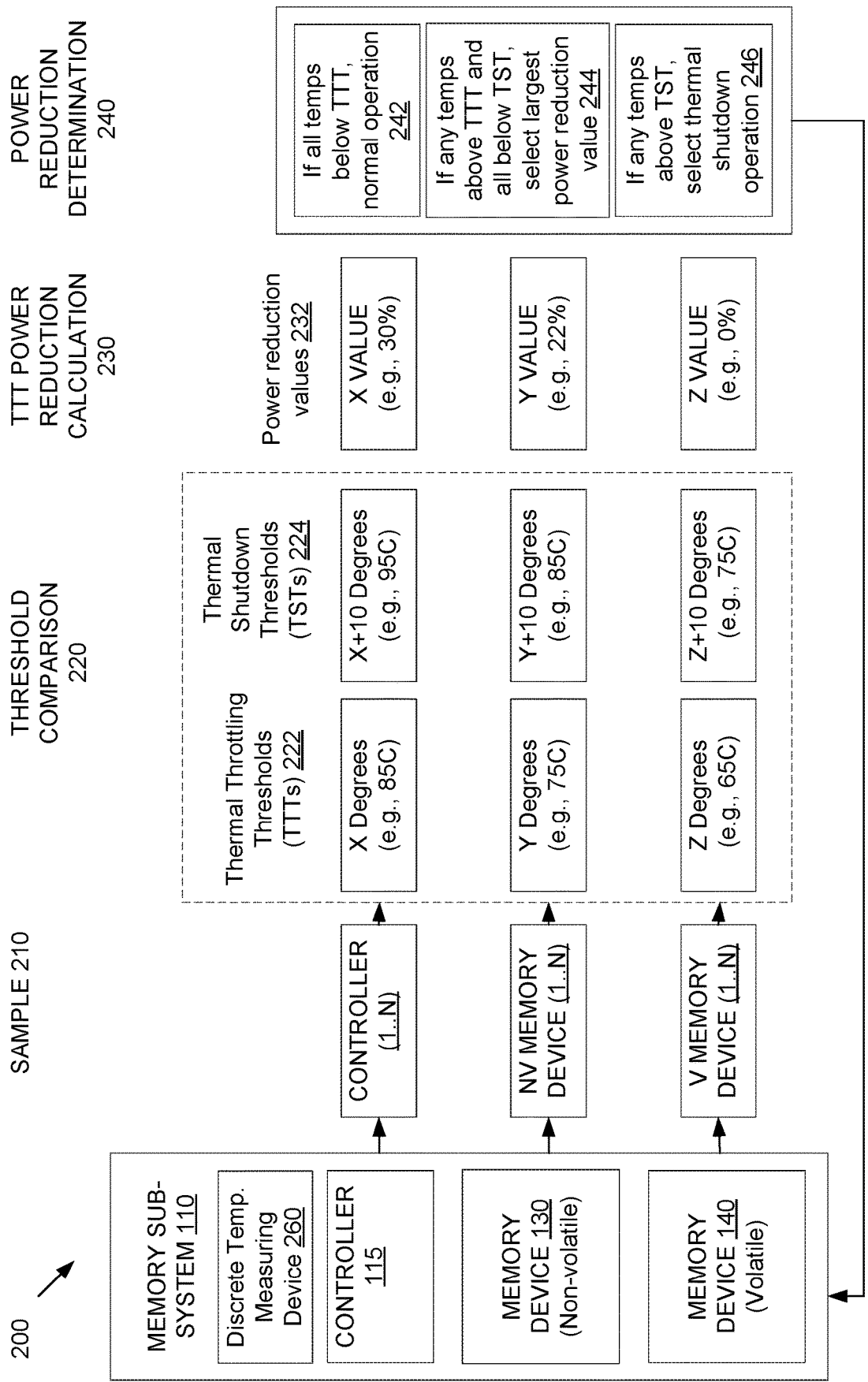
FIG. 2 is a diagram illustrating control operations to control the temperature of a system, such as a memory sub-system, in accordance with embodiments of the disclosure.

FIG. 2 is a diagram illustrating control operations to control the temperature of a system, such as a memory sub-system, in accordance with embodiments of the disclosure. Diagram 200 illustrates memory sub-system 110 and temperature control operations including sample 210, threshold comparison 220, thermal throttling threshold (TTT) reduction calculation 230, power reduction determination 240 and feedback 250. Thermal manager component 113 of FIG. 1 can execute the control operations, unless otherwise described.

In some embodiments, a memory sub-system 110 can operate in different modes based on the detected thermal state of devices of the memory sub-system 110. The modes can include normal mode, thermal throttling mode, and thermal shutdown mode. In some embodiments, normal mode can include a normal operation of the memory sub-system 110 where the memory sub-system 110 or the devices thereof (e.g., controller 115, memory device(s) 130, and/or memory device(s) 140) are operating at or below device temperatures specified by the thermal throttling thresholds. In normal mode, no power reducing operations (e.g., thermal throttling) are performed due to excessive temperatures at the memory sub-system or the devices thereof are implemented.

Thermal throttling mode and thermal shutdown mode can be implemented to protect the devices of the memory sub-system 110, an in particular protect the controller 115, memory devices 130 (e.g., NAND) and memory devices 140 (e.g., DDR) from thermal stress. In thermal throttling mode, one or more power reducing operations can be performed such that the power consumption (and the performance) of the memory sub-system 110 is reduced (e.g., throttled) in an effort to reduce the temperature of the memory sub-system 110 and reduce the thermal stress on the devices of the memory sub-system 110. In some embodiments, in thermal throttling mode, the number of input and output (I/O) operations, such as read operations and write operations, performed by the memory sub-system 110 can be reduced as compared to normal operation. Thermal shutdown can be implemented near or at the maximum temperature limit for one or more devices of the memory sub-system 110. In thermal shutdown mode, thermal shutdown operations can be performed such that the power consumption (and the performance) of the memory sub-system is reduced at an even greater degree than in thermal throttling mode. In thermal shutdown mode, the I/O operations can be reduced further or disabled until the memory sub-system 110 or devices therein return to a lower specified temperature. It can be noted that a thermal shutdown operation can include a subset of power reducing operations, in some embodiments.

In some embodiments, power reducing operations and/or thermal shutdown operations can include reducing the number of dice of memory devices (e.g., volatile memory devices, memory device 130) at which parallel I/O operations (e.g., read and/or write) can be performed. For example, the memory sub-system 110 can include 100 dice total for the X number of memory devices 130. In normal mode, the memory sub-system 110 is permitted to perform I/O operations in parallel at all 100 dice. In thermal throttling mode, the memory sub-system 110 is permitted to perform I/O operations in parallel at a fraction of the 100 dice. For instance, to implement a 30 percent power reduction, the memory sub-system 110 is permitted to perform parallel I/O operations at 70 (or less) out of the 100 dice of the memory devices 130 at any instance. In thermal shutdown mode, the memory sub-system 110 is permitted to perform parallel I/O operations on 0 out of the 100 dice of the memory devices 130 at any instance. In some embodiments, in thermal shutdown mode, the memory sub-system 110 is not permitted to perform any I/O operations.

In some embodiments, power reducing operations can include introducing delay in performing I/O operations on the dice of the memory devices 130. Using the above example, the memory sub-system 110 includes 100 dice total for the X number of memory devices 130. In normal mode, the memory sub-system 110 introduces no delay in performing perform I/O operations at all 100 dice. In thermal throttling mode, the memory sub-system 110 introduces delay to perform I/O operations at the 100 dice. For instance, to implement a 30 percent power reduction, the memory sub-system 110 is permitted to introduce 30 percent of a maximum delay (e.g., 10 seconds) or 3 seconds of delay in performing I/O operations received from the host system. It can be noted that time of the delay are used for purpose of illustration rather than limitation. Delays can be implemented that are appropriate for a particular system, and delays can also be in the milli- to micro-second domain. In thermal shutdown mode, the memory sub-system 110 does not perform any I/O operations at any of the 100 dice of the memory devices 130. In some embodiments, power reduction operations can include reducing the number of dice of memory devices at which parallel I/O operations can be performed, introducing delay in performing I/O operations at the dice of memory devices, or a combination thereof.

In some embodiments, device temperature samples from one or more devices, such as controller 115, memory device(s) 130, and/or memory device(s) 140, of the memory sub-system 110 can be sent to thermal manager component 113. In some embodiments, a direct temperature measurement to obtain the device measurement samples can be made by at least one of the devices of the memory sub-system 110. A direct temperature measurement can be a measurement that is made on-chip at the particular device. For example, the controller 105 can include an on-chip temperature measurement device that measures the temperature at the controller 105. In some embodiments, each device can be device that is individually packaged in packaging material with terminals that connect the die or dice internal to the device to the external environment (such as terminals of a printed circuit board). In some embodiments, in lieu of direct temperature measurements, device temperature samples can be obtained by other devices as a proxy for devices of the memory sub-system 110. For example, a discrete temperature sensor, such as discrete temperature measuring device 260, can be mounted near a memory device 140 and device temperature samples from the discrete temperature sensor can be used as a proxy for the temperature of the memory device 140. In some embodiments, in lieu of direct temperature measurements, one or more offsets can be used with one or more direct temperature measurements at one or more devices to estimate the temperature at one or more other devices.

In some embodiments, at sample operation 210 device temperature samples from multiple devices of the memory sub-system 110 are received by thermal manager component 113. The device temperature samples for each device are used to determine device temperature values for each of the devices. The device temperature samples can be received multiple times per second, for example. The device temperature values are indicative of the temperature at a respective device of the memory sub-system 110. In an example, a device temperature value can be a temperature value of a device in degrees Celsius. In another example, a device temperature value can be determined for the controller 105, another device temperature value can be determined for the memory device(s) 130, and still another device temperature value can be determined for the memory device(s) 140. For purposes of illustration, rather than limitation, a single device temperature value for the memory device(s) 130 and a single device temperature value for memory device(s) 140 is described. In other embodiments, a device temperature value can be determined for a single memory device 130 or 140, for a sub-group of memory devices 130 or 140, for all the memory devices 130 or 140, or a combination thereof. In some embodiments, multiple device temperature values can be determined for different memory devices 130 or 140 or sub-groups of memory devices 130 or 140.

The device temperature values determined from the device temperature samples can be determined using one or more techniques. In some embodiments, a particular device temperature value can be determined using multiple device temperature samples. In some embodiments, a moving average filter (e.g. finite impulse response (FIR) filter) can use the device temperature samples form the various devices of the memory sub-system 110 to determine respective device temperature values for the devices of the memory sub-system 110. In other embodiments, one or more of the highest device temperature samples and/or one or more the lowest device temperature samples can be removed and an average of the remaining samples (e.g., moving average) can be used to determine respective device temperature values. In some embodiments, temperature samples can be filtered to remove spurious temperature samples, remove undesirable temperature samples above or below predetermined values or remove undesirable temperature samples that are outside a given range of acceptable values.

In some embodiments, at the threshold comparison operation 220, a device temperature value for a particular device can be compared to one or more thresholds that are associated with the particular device. For example, controller 105 can be associated with a particular thermal throttling threshold (TTT) 222 and a particular thermal shutdown threshold (TST) 224, the memory device 130 can be associated with a different TTT 222 and a different TST 224, and the memory device 140 can be associated with a still different TTT 222 and still different TST 224. A TTT can be associated with thermal throttling mode and a TST can be associated with thermal shutdown mode. For a particular device of the memory sub-system 110, the TTT can identify a lower device temperature value threshold than a corresponding TST for the same device.

In some embodiments, at the threshold comparison operation 220, the device temperature values for each of the devices of the memory sub-system 110 are compared to respective ones of the thermal throttling threshold (TTT) 222. In some embodiments, each of the devices of the memory sub-system 110 can have an independent TTT, as illustrated. For example, the TTT corresponding to the controller 115 is X degrees, the TTT corresponding to the memory device 130 is Y degrees, and the TTT corresponding to the memory device 140 is Z degrees.

In some embodiments, if all the device temperature values for all the devices of the memory sub-system 110 are below respective TTTs 222, the thermal manager component 113 can cause the memory sub-system 110 to operate in normal operation mode (and operation 230 is not performed). In some embodiments, if at least one of the device temperature values satisfy (e.g., meets or exceed) the respective TST, the thermal manager component 113 can cause the memory sub-system 110 to operate in thermal shutdown mode (and operation 230 is not performed). In some embodiments, if at least one of the device temperature values satisfies the respective TTT (e.g., at least one of the device temperature values is greater than the respective TTT and all device temperature values are less than respective TST), the thermal manager component 113 proceeds to TTT power reduction calculation operation 230.

In some embodiments, at TTT power reduction calculation operation 230, a power reduction value for each of devices of the memory sub-system 110 can be calculated. In some embodiments, a power reduction value for each of the devices of the memory sub-system 110 can be calculated if one or more of the device temperature values satisfy the respective TTTs. In some embodiments, a power reduction value can indicate an amount of power consumption of a memory sub-system 110 that is to be reduced. For example, the power reduction value can indicate that 10 percent, 25 percent, or 70 percent, for example, of the power consumption of a memory sub-system 110 can be reduced. In some embodiments, the amount of reduction can based on the power consumption of the memory sub-system 110 in normal operation (e.g., average power consumption of the memory sub-system 110 in normal mode).

In some embodiments, the power reduction value can correspond to or be proportional to the amount that a device temperature value exceeds a respective TTT. In some embodiments, the power reduction value can be proportional to one or more of the number of degrees that the device temperature value exceeds the TTT and the range between the corresponding TST and TTT (e.g., TST less the TTT). For example, if the device temperature value of the controller 105 exceeds the respective TTT by 1 degree Celsius, the power reduction value can indicate a 10 percent reduction in power consumption of the memory sub-system 110 (e.g., given there is a 10 degree difference between the TTT and the TST and 1 degree is $\frac{1}{10}^{th}$ the difference). If the device temperature value of the controller 105 exceeds the respective TTT by 2.7 degrees Celsius, the power reduction value can indicate a 27 percent reduction in power consumption of the memory sub-system 110. If the temperature value of the controller 105 exceeds the respective TTT by 7 degrees Celsius, the power reduction value can indicate a 70 percent reduction in power consumption.

In some embodiments, the power reduction value can be an integral value that increases in relation to the amount that a device temperature value exceeds a respective TTT and the time during with a device temperature value exceeds a respective TTT. For example, if an initial power reduction value is not enough to bring the difference between the device temperature value and the respective TTT to 0, the subsequent power reduction value(s) will be increased as time passes.

In some embodiments, the power reduction value can be a derivative value that changes based on the rate of change that device temperature values exceed a respective TTT. If the rate of change that the device temperature values exceed a respective TTT increases the power reduction value increases. If the rate of change that the device temperature values exceeds the respective TTT decreases, the power reduction value decreases. In some embodiments, the power reduction value can be determined using one or more of proportional, integral or derivative control as described herein. In some embodiments, proportional control can include one or more of proportional, integral or derivative control as described herein. In some embodiments, the power reduction value can be continuously modulated to continuously control the power reduction (e.g., amount of power consumption of the system that is to be reduced) of the memory sub-system 110 or the devices therein. Using a continuous modulation allows the temperature of memory sub-system 110 and the devices therein to be more efficiently controlled and can contribute to the stability of the temperature control system. In some embodiments, the power reduction value can be a continuous value (rather than a discrete value) that is continuous within the constraints of the system or implementation (e.g., within the resolution of the temperature measurements). For example, the power reduction value can be a real number value between 0 percent (e.g., amount of power consumption of the system that is to be reduced) and 100 percent power reduction.

In some embodiments, at the power reduction determination operation 240, thermal manager component 113 can implement control logic (e.g., logic 242, logic 244, and logic 246) based on the comparison of the device temperature values at threshold comparison operation 220 to the respective TTTs and/or respective TSTs. In some embodiments at logic 242, if all of the temperature values associated with the devices of the memory sub-system are below the respective TTTs, thermal manager component 113 can cause the memory sub-system 110 to operate in normal operation. In some embodiments at logic 244, if at least one of the device temperature values is above the respective TTT and all the device temperature values are below respective TSTs, the thermal manager component 113 causes the memory sub-system 110 to select the largest power reduction value from the power reductions values 232 calculated at TTT power reduction calculation operation 230 and perform a power reduction operation in accordance with the selected power reduction value. The largest power reduction value can produce the largest power reduction of the system.

In some embodiments at logic 246, if any of the device temperature values of any of the devices of the memory sub-system 110 satisfy (e.g., exceed or meet) the respective TST, thermal manager component 113 causes the memory sub-system 110 to perform a thermal shutdown operation. In some embodiments, to exit thermal shutdown operation (e.g., thermal shutdown mode), one or more or all of the device temperature values are determined to be below the respective TTTs. If one or more of all of the device temperature values are below the respective TTTs, the thermal manager component 113 can cause the memory sub-system 110 to change operation from thermal shutdown operation to normal operation.

In some embodiments, the determined result from power reduction determination operation 240 is provided as feedback (e.g., feedback operation 150) to memory sub-system 110 to control the mode of the memory sub-system 110 (e.g., normal mode, thermal throttling mode, and thermal shutdown mode).

Methods 300 and 350 described below with respect to FIG. 3A and FIG. 3B can be performed by processing logic that can include a hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 or 350 is performed by the thermal manager component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used. In embodiments, thermal manager component 113 can perform one or more of the operations described herein.

Figure 3A:
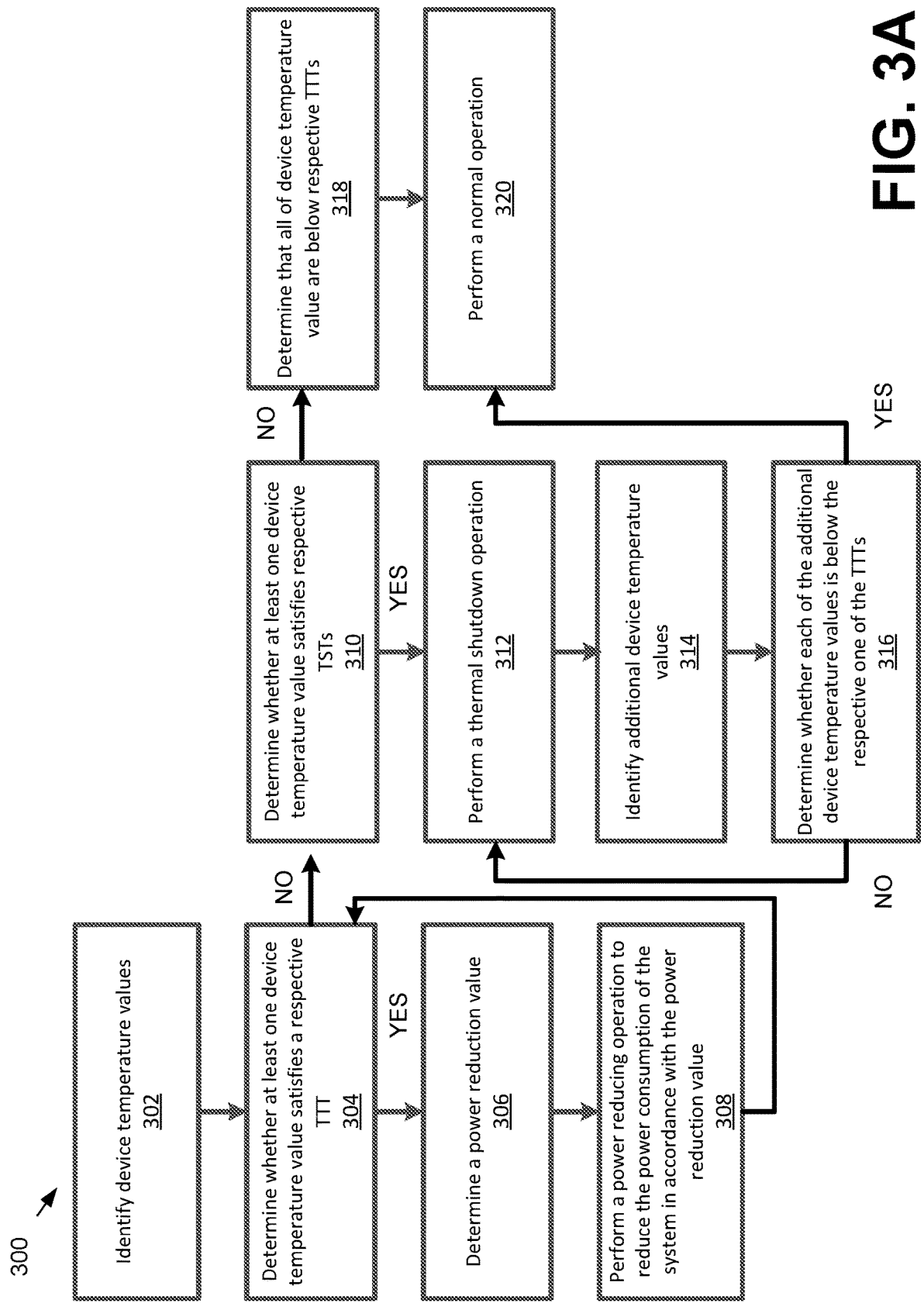
FIG. 3A is a flow diagram of an example method to perform a power reducing operation, in accordance with some embodiments of the disclosure.

FIG. 3A is a flow diagram of an example method to perform a power reducing operation, in accordance with some embodiments of the disclosure.

At operation 302, processing logic performing method 300 identifies device temperature values. In some embodiments, processing logic identifies device temperature values that are each indicative of a temperature at a respective device of the system. In some embodiments, at least one of the device temperature values is from a direct temperature measurement at the respective device of the multiple devices. In some embodiments, the system includes a memory sub-system. The memory device of the memory sub-system includes one or more non-volatile memory devices. The processing device includes a controller of the memory sub-system.

At operation 304, processing logic determines whether at least one device temperature value satisfies a respective thermal throttling threshold (TTT). In some embodiments, processing logic determines whether at least one device temperature value of the device temperature values satisfies a respective thermal throttling threshold of multiple thermal throttling thresholds by comparing each of the device temperature values to a respective one of the thermal throttling thresholds that each correspond to one of the devices. If processing logic determines that at least one device temperature value satisfies a respective TTT, processing logic proceeds to operation 306. If processing logic determines that at least one device temperature value does not satisfy a respective TTT, processing logic proceeds to operation 310.

In some embodiments, to determine the at least one device temperature value of the multiple device temperature values satisfies the respective thermal throttling threshold, processing logic determines that the at least one device temperature value exceeds the respective thermal throttling threshold. Responsive to determining that the at least one device temperature value exceeds the respective thermal throttling threshold, processing logic determines that each of the device temperature values do not exceed a respective thermal shutdown threshold of multiple thermal shutdown thresholds.

At operation 306, processing logic determines a power reduction value. In some embodiments, responsive to determining that the at least one device temperatures value satisfies the respective thermal throttling threshold, processing logic determines a power reduction value that is indicative of an amount of power consumption of the system that is to be reduced.

In some embodiments, to determine the power reduction value that is indicative of the amount of power consumption of the system that is to be reduced, processing logic determines a power reduction value for each of the devices based on the device temperature values. Processing logic selects, from the power reduction values, a first power reduction value indicative of a greatest reduction of power consumption reduction.

At operation 308, processing logic performs a power reducing operation to reduce the power consumption of the system in accordance with the power reduction value. In some embodiments, to perform the power reducing operation to reduce the power consumption of the system in accordance with the power reduction value, processing logic reduces a number of die at which parallel I/O operations (e.g., read operations and write operations) can be performed in accordance with the power reduction value.

In some embodiments, the power reduction value is proportional to a number of degrees that the at least one of the device temperature values exceeds the respective thermal throttling threshold. In some embodiments, the power reducing operation reduces the power consumption of the system proportional to the number of degrees that the at least one of the device temperature values exceeds the respective thermal throttling threshold.

At operation 310, processing logic determines whether at least one device temperature value satisfies a respective thermal shutdown threshold (TST). If processing logic determines that at least one device temperature value satisfies a respective TST, processing logic proceeds to operation 312. If processing logic determines that at least one device temperature value does not satisfy a respective TST, processing logic proceeds to operation 318. In some embodiments, satisfying a TST includes one or more of at least one device temperature value meeting or exceeding a respective TST.

In some embodiments, processing logic determines whether at least one device temperature value of the multiple device temperature values satisfies a respective thermal shutdown threshold of multiple thermal shutdown thresholds by comparing each of the device temperature values to a respective one of the multiple thermal shutdown thresholds that each correspond to one of the devices.

At operation 312, processing logic performs a thermal shutdown operation. In some embodiments, responsive to determining the at least one device temperature value of the multiple device temperature values satisfies the respective thermal shutdown threshold, processing logic performs a thermal shutdown operation that discontinues input and output (I/O) operations at the memory device.

At operation 314, processing logic identifies additional device temperature values (e.g., subsequent device temperature values). In some embodiments, processing logic identifies additional device temperature values that are each indicative of the temperature at the respective device of the devices of the system.

At operation 316, processing logic determines whether each of the additional device temperature values is below the respective one of the TTTs. Responsive to determining that each of the additional device temperature values is below the respective one of the TTTs, processing logic proceeds to operation 320. Responsive to determining that all of the additional device temperature values are not below the respective TTTs, processing logic returns to operation 312.

At operation 318, processing logic determine that all of device temperature value are below respective TTTs. At operation 320, processing logic performs a normal operation. In some embodiments, responsive to determining that each of the additional device temperature values is below the respective one of the thermal throttling thresholds (e.g., operation 316), processing logic terminates the thermal shutdown operation and performs normal operation.

Figure 3B:
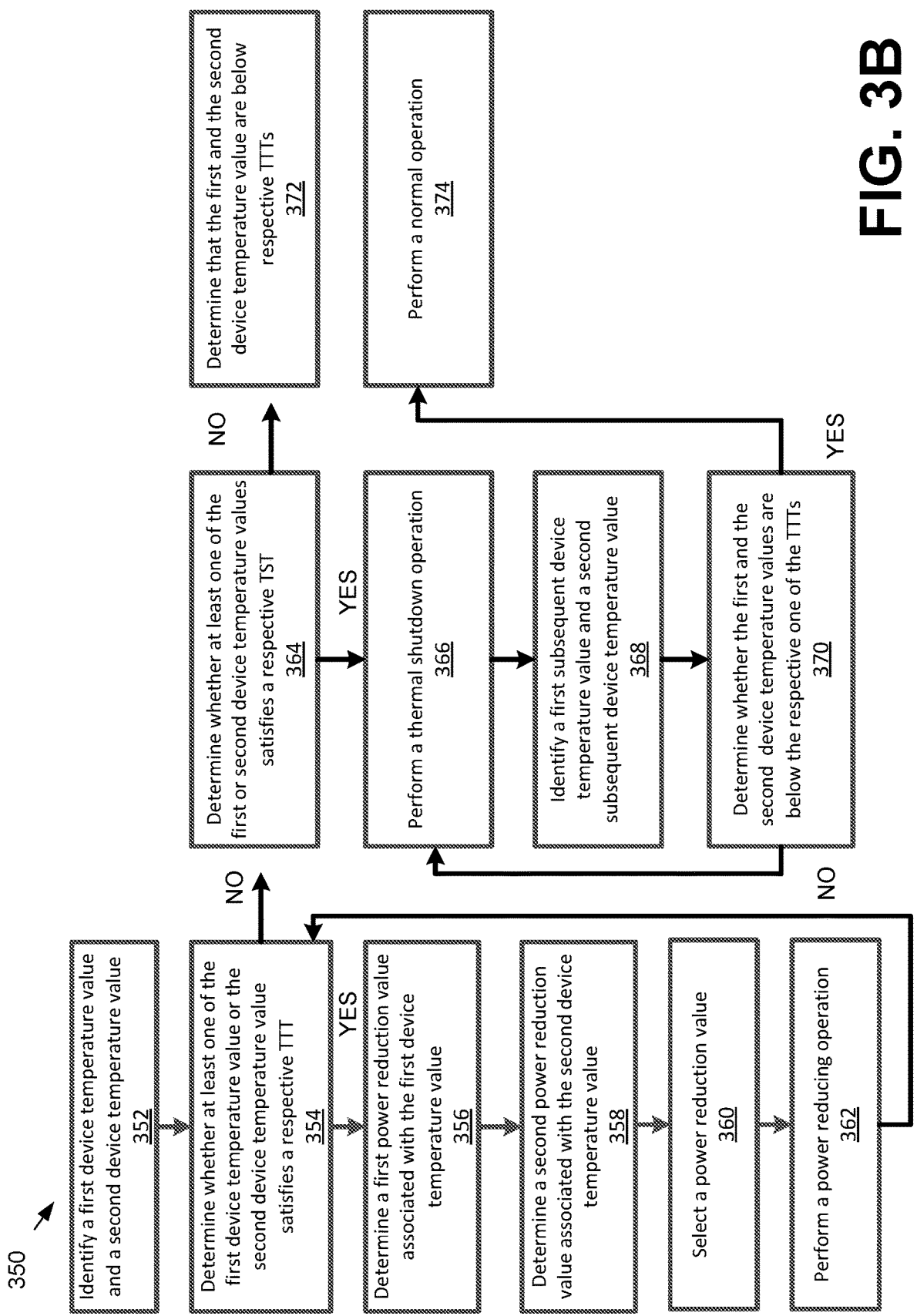
FIG. 3B is a flow diagram of an example method to perform a power reducing operation, in accordance with some embodiments of the disclosure.

FIG. 3B is a flow diagram of an example method to perform a power reducing operation, in accordance with some embodiments of the disclosure.

At operation 352 of method 350, processing logic identifies a first device temperature value and a second device temperature value. In some embodiments, processing logic identifies a first device temperature value that is indicative of a temperature at a first device of a memory sub-system and a second device temperature value that is indicative of a temperature at a second device of the memory sub-system. It can be noted two device temperature values associated with two devices are described for purposes of illustration, rather than limitation. In some embodiments, the method 350 can be implemented with any number of device (e.g., N number of devices with N number of TTTs and N number of TSTs).

At operation 354, processing logic determines whether at least one of the first device temperature value or the second device temperature value satisfies a respective TTT. In some embodiments, processing logic determines whether at least one of the first device temperature value satisfies a first thermal throttling threshold that corresponds with the first device or the second device temperature value satisfies a second thermal throttling threshold that corresponds with the second device. Responsive to determining that at least one of the first device temperature or the second device temperature value satisfies a respective TTT, processing logic proceeds to operation 356. Responsive to determining that at least one of the first device temperature or the second device temperature value does not satisfy a respective TTT, processing logic proceeds to operation 364.

In some embodiments, to determine that the at least one of the first device temperature value satisfies a first thermal throttling threshold that corresponds with the first device or that the second device temperature value satisfies a second thermal throttling threshold that corresponds with the second device, processing logic determines that the at least one of the first device temperature value exceeds the first thermal throttling threshold or the second device temperature value exceeds the second thermal throttling threshold. Responsive to determining that the at least one of the first device temperature value exceeds the first thermal throttling threshold or the second device temperature value exceeds the second thermal throttling threshold, processing logic determines that each of the first device temperature value and the second device temperature value does not exceed a first thermal shutdown threshold and a second thermal shutdown threshold respectively.

At operation 356, processing logic determines a first power reduction value associated with the first device temperature value. In some embodiments, responsive to determining that the at least one of the first device temperature value satisfies the first thermal throttling threshold or the second device temperature value satisfies the second thermal throttling threshold, processing logic determines a first power reduction value associated with the first device temperature value and indicative a first amount of power consumption of system that is to be reduced. In some embodiments, the first amount of power consumption that is to be reduced is proportional to the amount that the first device temperature value exceeds the first thermal throttling threshold.

At operation 358, processing logic determines a second power reduction value associated with the second device temperature value. In some embodiments, responsive to determining that the at least one of the first device temperature value satisfies the first thermal throttling threshold or the second device temperature value satisfies the second thermal throttling threshold, processing logic determines a second power reduction value associated with the second device temperature value and indicative a second amount of power consumption of system that is to be reduced. In some embodiments, the second amount of power consumption that is to be reduced is proportional to an amount that the second device temperature value exceeds the second thermal throttling threshold.

At operation 360, processing logic selects a power reduction value. In some embodiments, the power reduction value is selected based on one or more criterion. In some embodiments, processing logic selects, from the first power reduction value and the second power reduction value, a power reduction value indicative of a greatest reduction of power consumption.

At operation 362, processing logic performs a power reducing operation. In some embodiments, processing logic performs a power reducing operation in accordance with the selected power reduction value. In some embodiments, responsive to determining that at least one of the first device temperature value satisfies the first thermal throttling threshold or the second device temperature satisfies the second thermal throttling threshold, processing logic performs a power reducing operation that reduces a power consumption of the memory sub-system proportional to an amount that the first device temperature value exceeds the first thermal throttling threshold.

At operation 364, processing logic determines whether at least one of the first or second device temperature values satisfies a respective TST. Responsive to determining that at least one of the first or second device temperature values satisfies a respective TST, processing logic proceeds to operation 366. Responsive to determining that at least one of the first or second device temperature values does not satisfy a respective TST, processing logic proceeds to operation 372.

In some embodiments, processing logic determines whether at least one of the first device temperature value satisfies a first thermal shutdown threshold or the second device temperature value satisfies a second thermal shutdown threshold.

At operation 366, processing logic performs a thermal shutdown operation. In some embodiments, responsive to determining the at least one of the first device temperature value satisfies the first thermal shutdown threshold or the second device temperature value satisfies the second thermal shutdown threshold, processing logic performs a thermal shutdown operation that discontinues input and output (I/O) operations at the memory sub-system.

At operation 368, processing logic identifies a first subsequent device temperature value and a second subsequent device temperature value. In some embodiments, processing logic identifies a first subsequent device temperature value that is indicative of the temperature at the first device of the memory sub-system and a second subsequent device temperature value that is indicative of the temperature at the second device of the memory sub-system.

At operation 370, processing logic determine whether the first and second device temperature values are below the respective one of the TTTs. Responsive to determining that the first and second device temperature values are below the respective one of the TTTs, processing logic proceeds to operation 374. Responsive to determining that the first and second device temperature values are not below the respective one of the TTTs, processing logic proceeds to operation 366.

In some embodiments, processing logic determines whether the first subsequent device temperature value is below the first thermal throttling threshold and the second subsequent device temperature values is below the second thermal throttling threshold.

In some embodiments, responsive to determining that the first subsequent device temperature value is below the first thermal throttling threshold and the second subsequent device temperature values is below the second thermal throttling threshold, processing logic terminates the thermal shutdown operation and performs a normal operation (e.g., operation 374).

At operation 372, processing logic determines that the first and the second device temperature value are below respective TTTs. At operation 374, processing logic performs a normal operation.

Figure 4:
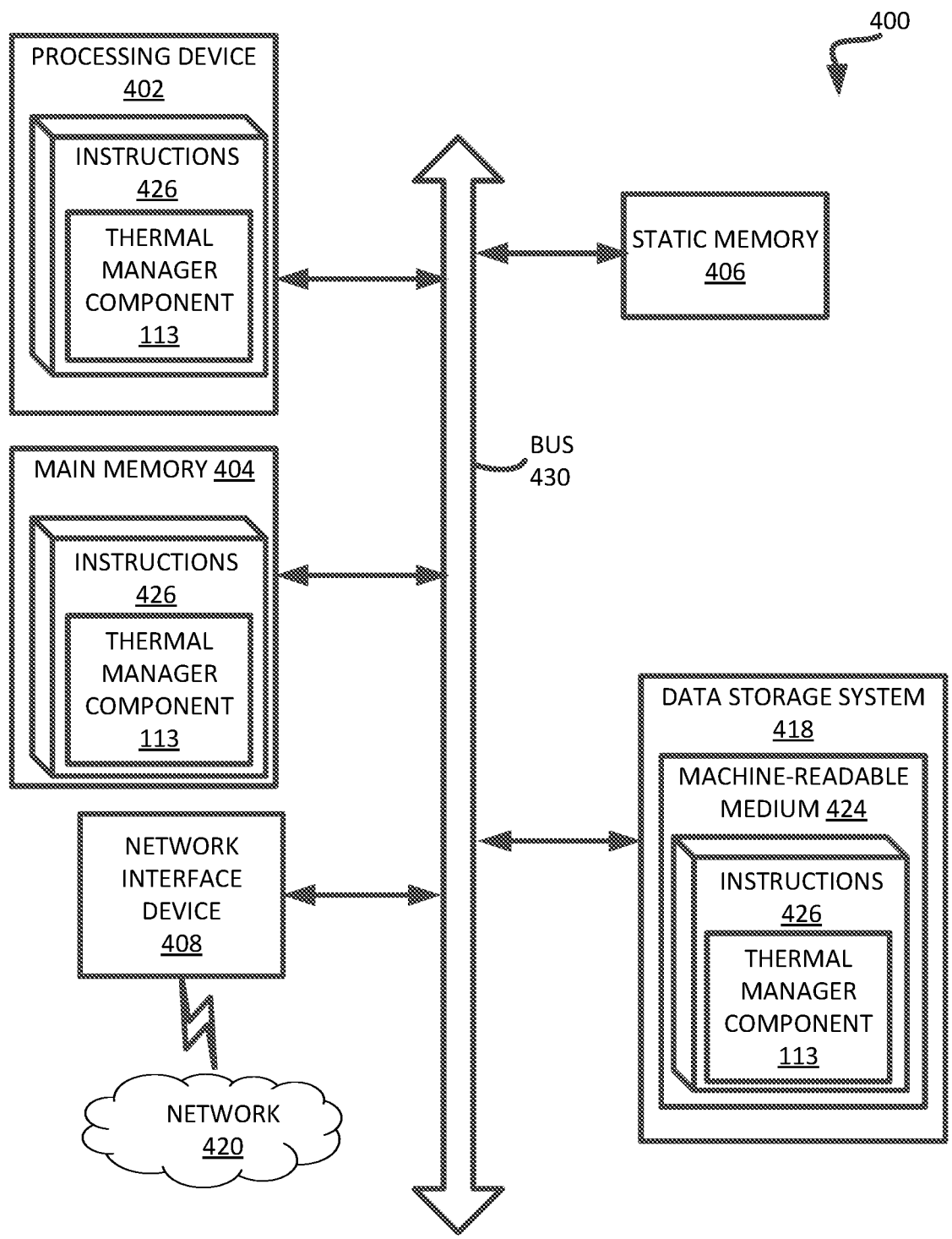
FIG. 4 illustrates an example machine of a computer system within which a set of instructions, for causing the machine to perform any one or more of the methodologies discussed herein, can be executed.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the thermal manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a non-transitory computer-readable storage medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to the thermal manager component 113 of FIG. 1. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device of a plurality of devices; and
   a processing device of the plurality of devices, coupled with the memory device, to perform operations comprising:
   identifying a plurality of device temperature values that are each indicative of a temperature at a respective device of the plurality of devices of the system;
   determining whether at least one device temperature value of the plurality of device temperature values satisfies a respective thermal throttling threshold of a plurality of thermal throttling thresholds by comparing each of the plurality of device temperature values to a respective one of the plurality of thermal throttling thresholds that each correspond to one of the plurality of devices;

responsive to determining that the at least one device temperature value satisfies the respective thermal throttling threshold, determining a power reduction value that is indicative of an amount of power consumption of the system that is to be reduced; and performing a power reducing operation to reduce the power consumption of the system in accordance with the power reduction value.

2. The system of claim 1, wherein the power reduction value is proportional to a number of degrees that the at least one of the plurality of device temperature values exceeds the respective thermal throttling threshold, and wherein the power reducing operation reduces the power consumption of the system proportional to the number of degrees that the at least one of the plurality of device temperature values exceeds the respective thermal throttling threshold.

3. The system of claim 1, wherein determining the at least one device temperature value of the plurality of device temperature values satisfies the respective thermal throttling threshold, the operations further comprising:

determining that the at least one device temperature value exceeds the respective thermal throttling threshold; and responsive to determining that of the at least one device temperature value exceeds the respective thermal throttling threshold, determining that each of the plurality of device temperature values do not exceed a respective thermal shutdown threshold of a plurality of thermal shutdown thresholds.

4. The system of claim 1, the operations further comprising:

determining whether at least one device temperature value of the plurality of device temperature values satisfies a respective thermal shutdown threshold of a plurality of thermal shutdown thresholds by comparing each of the plurality of device temperature values to a respective one of the plurality of thermal shutdown thresholds that each correspond to one of the plurality of devices; and responsive to determining the at least one device temperature value of the plurality of device temperature values satisfies the respective thermal shutdown threshold, performing a thermal shutdown operation that discontinues input and output (I/O) operations at the memory device.

5. The system of claim 4, the operations further comprising:

identifying an additional plurality of device temperature values that are each indicative of the temperature at a respective device of the plurality of devices of the system;

determining whether each of the additional plurality of device temperature values is below the respective one of the plurality of thermal throttling thresholds; and responsive to determining that each of the additional plurality of device temperature values is below the respective one of the plurality of thermal throttling thresholds, terminating the thermal shutdown operation.

6. The system of claim 1, wherein determining the power reduction value that is indicative of the amount of power consumption of the system that is to be reduced, comprises:

determining a power reduction value for each of the plurality of devices based on the plurality of device temperature values; and selecting, from the plurality of power reduction values, a first power reduction value indicative of a greatest reduction of power consumption reduction.

7. The system of claim 1, wherein at least one of the plurality of device temperature values is from a direct temperature measurement at the respective device of the plurality of devices, wherein the system comprises a memory sub-system, wherein the memory device comprises a non-volatile memory device, and wherein the processing device comprises a controller of the memory sub-system.

8. The system of claim 1, wherein performing the power reducing operation to reduce the power consumption of the system in accordance with the power reduction value, the processing device to:

reducing a number of die at which parallel input and output (I/O) operations can be performed in accordance with the power reduction value.

9. A method comprising:

identifying a first device temperature value that is indicative of a temperature at a first device of a memory sub-system and a second device temperature value that is indicative of a temperature at a second device of the memory sub-system;

determining whether at least one of the first device temperature value satisfies a first thermal throttling threshold that corresponds with the first device or the second device temperature value satisfies a second thermal throttling threshold that corresponds with the second device; and responsive to determining that at least one of the first device temperature value satisfies the first thermal throttling threshold or the second device temperature satisfies the second thermal throttling threshold, performing a power reducing operation that reduces a power consumption of the memory sub-system proportional to an amount that the first device temperature value exceeds the first thermal throttling threshold.

10. The method of claim 9, further comprising:

responsive to determining that the at least one of the first device temperature value satisfies the first thermal throttling threshold or the second device temperature value satisfies the second thermal throttling threshold:

determining a first power reduction value associated with the first device temperature value and indicative a first amount of power consumption of system that is to be reduced, wherein the first amount of power consumption that is to be reduced is proportional to the amount that the first device temperature value exceeds the first thermal throttling threshold; and determining a second power reduction value associated with the second device temperature value and indicative a second amount of power consumption of system that is to be reduced, wherein the second amount of power consumption that is to be reduced is proportional to an amount that the second device temperature value exceeds the second thermal throttling threshold.

11. The method of claim 10, further comprising:

selecting, from the first power reduction value and the second power reduction value, a power reduction value indicative of a greatest reduction of power consumption.

12. The method of claim 9, wherein determining the at least one of the first device temperature value satisfies a first thermal throttling threshold that corresponds with the first device or the second device temperature value satisfies a second thermal throttling threshold that corresponds with the second device comprises:

determining that the at least one of the first device temperature value exceeds the first thermal throttling threshold or the second device temperature value exceeds the second thermal throttling threshold; and responsive to that the at least one of the first device temperature value exceeds the first thermal throttling threshold or the second device temperature value exceeds the second thermal throttling threshold, determining that each of the first device temperature value and the second device temperature value does not exceed a first thermal shutdown threshold and a second thermal shutdown threshold respectively.

13. The method of claim 9, further comprising:

determining whether at least one of the first device temperature value satisfies a first thermal shutdown threshold or the second device temperature value satisfies a second thermal shutdown threshold; and responsive to determining the at least one of the first device temperature value satisfies the first thermal shutdown threshold or the second device temperature value satisfies the second thermal shutdown threshold, performing a thermal shutdown operation that discontinues input and output (I/O) operations at the memory sub-system.

14. The method of claim 13, further comprising:

identifying a first subsequent device temperature value that is indicative of the temperature at the first device of the memory sub-system and a second subsequent device temperature value that is indicative of the temperature at the second device of the memory sub-system;

determining whether the first subsequent device temperature value is below the first thermal throttling threshold and the second subsequent device temperature values is below the second thermal throttling threshold; and responsive to determining that the first subsequent device temperature value is below the first thermal throttling threshold and the second subsequent device temperature values is below the second thermal throttling threshold, terminating the thermal shutdown operation.

15. A non-transitory computer-readable medium comprising instructions that, responsive to execution by a processing device, cause the processing device to perform operations comprising:

identifying a plurality of device temperature values that are each indicative of a temperature at a respective device of a plurality of devices of a system;

determining whether at least one device temperature value of the plurality of device temperature values satisfies a respective thermal throttling threshold of a plurality of thermal throttling thresholds by comparing each of the plurality of device temperature values to a respective one of the plurality of thermal throttling thresholds that each correspond to one of the plurality of devices;

responsive to determining that the at least one device temperature value satisfies the respective thermal throttling threshold, determining a power reduction value that is indicative of an amount of power consumption of the system that is to be reduced; and performing a power reducing operation to reduce the power consumption of the system in accordance with the power reduction value.

16. The non-transitory computer-readable medium of claim 15, wherein the power reduction value is proportional to a number of degrees that the at least one of the plurality of device temperature values exceeds the respective thermal throttling threshold, and wherein the power reducing operation reduces the power consumption of the system proportional to the number of degrees that the at least one of the plurality of device temperature values exceeds the respective thermal throttling threshold.

17. The non-transitory computer-readable medium of claim 15, wherein determining the at least one device temperature value of the plurality of device temperature values satisfies the respective thermal throttling threshold, the operations further comprising:

determining that the at least one device temperature value exceeds the respective thermal throttling threshold; and responsive to determining that of the at least one device temperature value exceeds the respective thermal throttling threshold, determining that each of the plurality of device temperature values do not exceed a respective thermal shutdown threshold of a plurality of thermal shutdown thresholds.

18. The non-transitory computer-readable medium of claim 15, the operations further comprising:

determining whether at least one device temperature value of the plurality of device temperature values satisfies a respective thermal shutdown threshold of a plurality of thermal shutdown thresholds by comparing each of the plurality of device temperature values to a respective one of the plurality of thermal shutdown thresholds that each correspond to one of the plurality of devices; and responsive to determining the at least one device temperature value of the plurality of device temperature values satisfies the respective thermal shutdown threshold, performing a thermal shutdown operation that discontinues input and output (I/O) operations at a memory device.

19. The non-transitory computer-readable medium of claim 18, the operations further comprising:

identifying an additional plurality of device temperature values that are each indicative of the temperature at a respective device of the plurality of devices of the system;

determining whether each of the additional plurality of device temperature values is below the respective one of the plurality of thermal throttling thresholds; and responsive to determining that each of the additional plurality of device temperature values is below the respective one of the plurality of thermal throttling thresholds, terminating the thermal shutdown operation.

20. The non-transitory computer-readable medium of claim 15, wherein determining the power reduction value that is indicative of the amount of power consumption of the system that is to be reduced, comprises:

determining a power reduction value for each of the plurality of devices based on the plurality of device temperature values; and selecting, from the plurality of power reduction values, a first power reduction value indicative of a greatest reduction of power consumption reduction.

* * * * *